(12) United States Patent
Dumenil

(10) Patent No.: US 10,934,204 B2
(45) Date of Patent: Mar. 2, 2021

(54) PROCESS FOR BREAKING OUT AN INNER SHAPE IN A GLASS SHEET

(71) Applicant: SAINT-GOBAIN GLASS FRANCE, Courbevoie (FR)

(72) Inventor: Thierry Dumenil, Margny les Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/688,143

(22) Filed: Nov. 19, 2019

(65) Prior Publication Data

US 2020/0079677 A1 Mar. 12, 2020

Related U.S. Application Data

(63) Continuation of application No. 15/540,832, filed as application No. PCT/FR2015/053686 on Dec. 21, 2015, now Pat. No. 10,519,059.

(30) Foreign Application Priority Data

Dec. 31, 2014 (FR) ...................................... 1463467

(51) Int. Cl.
*C03B 33/033* (2006.01)
*C03B 33/04* (2006.01)

(52) U.S. Cl.
CPC ............ *C03B 33/033* (2013.01); *C03B 33/04* (2013.01); *B65G 2249/04* (2013.01)

(58) Field of Classification Search
None
See application file for complete search history.

(56) References Cited

U.S. PATENT DOCUMENTS 6,463,762 B1 10/2002 Ross, Jr.
6,829,910 B1 12/2004 Hsieh et al.
(Continued)

FOREIGN PATENT DOCUMENTS

| EP | 1 842 833 A1 | 10/2007 |
| JP | H07-223828 A | 8/1995 |
| JP | 2001-002438 A | 1/2001 |

OTHER PUBLICATIONS

International Preliminary Report on Patentability and then Written Opinion of the International Searching Authority as issued in International Patent Application No. PCT/FR2015/053686, dated Jul. 4, 2017.
(Continued)

*Primary Examiner* — Queenie S Dehghan
(74) *Attorney, Agent, or Firm* — Pillsbury Winthrop Shaw Pittman LLP

(57) ABSTRACT

A machine for breaking out an inner shape in a glass sheet, includes a cutting tool and a displacement system to produce a cutting line on a first side of the glass sheet that delimits an outer contour of the inner shape and an inner contour of a peripheral shape; a bearing system to bear against a second side of the sheet along the outer contour of the inner shape; a deformation system to deform one of the inner and peripheral shapes by convex bending toward the second side, the convex bending creating a differential deformation between the inner and peripheral shapes to break out the inner shape along the cutting line and separate the inner shape from the peripheral shape so that a distance needed for a contactless extraction is created, and an extraction system to extract the inner or peripheral shape while the convex bending is maintained.

14 Claims, 5 Drawing Sheets

(56) References Cited

U.S. PATENT DOCUMENTS

| | | | |
|---|---|---|---|
| 2002/0000099 A1* | 1/2002 | Bando | C03B 33/03 65/106 |
| 2010/0107848 A1 | 5/2010 | Joseph, II | |
| 2015/0191388 A1 | 7/2015 | Abramov | |
| 2016/0280579 A1 | 9/2016 | Yamamoto | |

OTHER PUBLICATIONS

International Search Report as issued in International Patent Application No. PCT/FR2015/053686, dated Mar. 23, 2016.

* cited by examiner

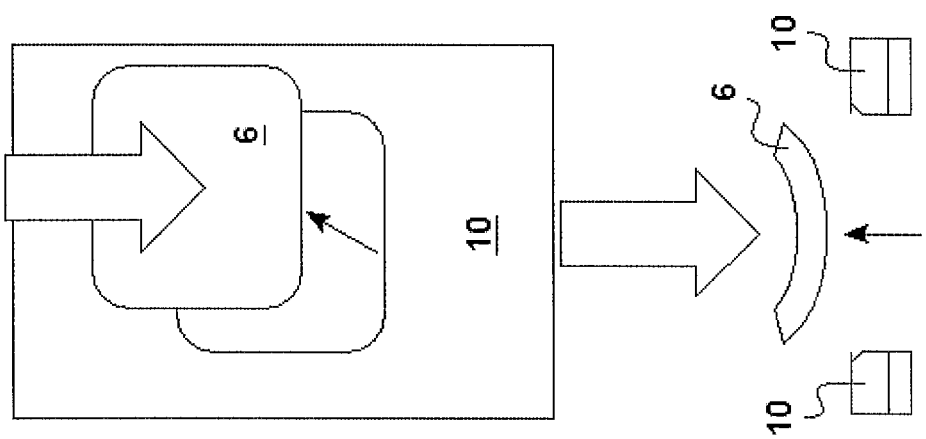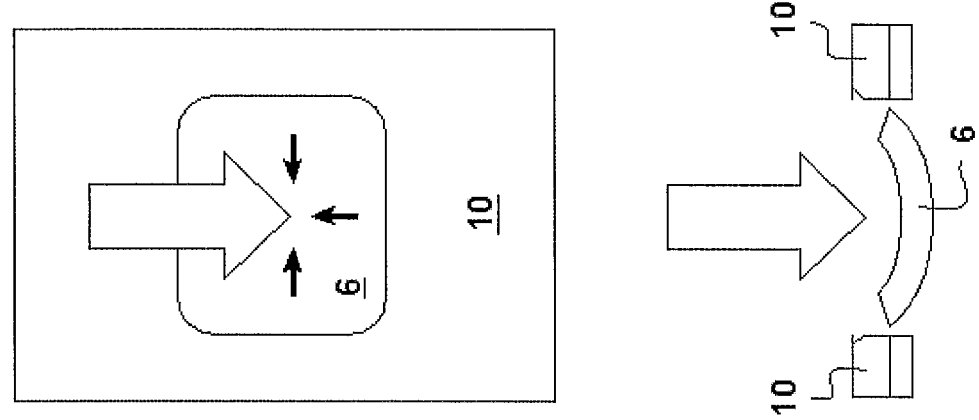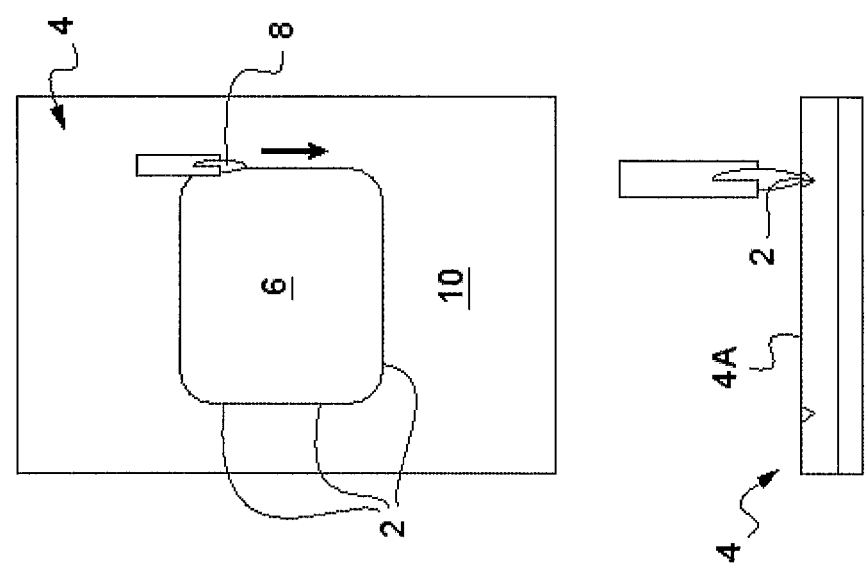

PROCESS FOR BREAKING OUT AN INNER SHAPE IN A GLASS SHEET

CROSS-REFERENCE TO RELATED APPLICATIONS

This application is a continuation of U.S. application Ser. No. 15/540,832 filed Jun. 29, 2017, which is the U.S. National Stage of PCT/FR2015/053686 filed on Dec. 21, 2015, which in turn claims priority to French patent application number 1463467 filed Dec. 31, 2014. The content of these applications are incorporated herein by reference in their entireties.

The present invention relates to the field of breaking out an inner shape in a glass sheet, for example with a view to forming an opening roof in a motor vehicle glazing that forms a roof or else for example a pivoting glazed opening within a motor vehicle side glazing, such as on certain sliding doors.

A first known technique consists in cutting out the inner shape by means of a waterjet (FIG. 1a). The waterjet produces a cut by removal of material between the inner shape and the main shape, which allows an easy separation (FIG. 1b). Nevertheless, the inner shape cannot be reused since, in order to be of good quality, the cut must begin inside the inner shape (FIG. 1a).

The inner shape must be cut out from another glass sheet (FIG. 1c) in which the edges will have been broken off, before assembling the two complementary shapes (FIG. 1d).

One drawback of this process is that the inner shape must be destroyed. In addition, the waterjet cutting process is slow.

Another faster process consists in using cutting with break-out.

There are two successive operations:
  a preliminary operation of scoring one or more surface cracks in the surface of the glass using, for example, a glass-cutting wheel or a laser; these cracks form lines at the contours of the shape; this operation is known as the "cutting" operation;
  an operation of propagating the initial surface crack through the thickness of the glass sheet; this operation is known as the "break-out" operation and allows the shape that is to be cut out to be separated from the initial glass sample known as the blank.

FIGS. 2a and 2b illustrate the cutting via scoring then pressing on the sacrificial central portion in order to achieve the break-out. Additional cutting lines (FIG. 2a) are then preferably provided in order to facilitate the breaking-out of the various fragments of the central portion.

But this technique also has the drawback of destroying the inner shape. It is necessary to cut out and finish an inner shape (FIG. 2c) from another glass sheet, and to assemble in fine the two complementary shapes (FIG. 1d).

One objective of the invention is to facilitate the cutting of an inner shape in a glass sheet.

For this purpose, one subject of the invention is a process for breaking out an inner shape in a glass sheet intended to form a glazing, comprising:
  a step of scoring a cutting line in the surface of the glass using a cutting tool, which cutting line delimits the outer contour of said inner shape and the inner contour of a peripheral shape;
  bringing the peripheral shape of the glass sheet into contact with a bearing means along the outer contour of the inner shape;
  the use of a deformation means for deforming one of the inner shape and of the peripheral shape by convex bending toward the side opposite the cutting line, the differential deformation between the inner shape and the peripheral shape being sufficient to break out the inner shape along the cutting line and create the distance needed for the contactless extraction of the inner shape relative to the peripheral shape, the extraction being carried out while maintaining the convex bending.

This process makes it possible to retain the inner shape and to use it as an opening of complementary shape for the window made in the glass sheet. This reduces the production cost.

In addition, the process is fast.

This break-out technique also has the advantage of being able to be incorporated into an existing line.

According to particular embodiments, the process additionally has one or more of the following features, taken alone or in any technically possible combination:
  the process uses a holding means that counters the effect of the deformation means in the other of the inner shape and of the peripheral shape;
  the bearing means extends over the entire outer contour of the inner shape, inside, opposite or outside relative to the cutting line;
  the bearing means comprises two bearing members, preferably one around the other;
  the bearing means comprises at least one seal for forming at least one low-pressure zone opposite at least one of the inner shape and of the outer shape;
  a low-pressure zone is a zone of convex bending deformation of said one of the inner shape and of the peripheral shape, the deformation means being a suction means;
  a low-pressure zone is a holding zone that counters the deformation of said other of the inner shape and of the peripheral shape, the holding means being a suction means;
  the bearing means is suitable for being used for bearing against said other of the inner shape and of the peripheral shape during the breaking-out of the inner shape;
  the deformation means is or comprises a convex counter-form suitable for pressing said one of the inner shape and of the peripheral shape in convex bending.

Another subject of the invention is a machine for breaking out an inner shape in a glass sheet intended to form a glazing, comprising:
  a cutting tool and means for the automatic displacement of said tool in order to produce a cutting line that delimits the outer contour of said inner shape and the inner contour of a peripheral shape;
  a bearing means for bearing against the glass sheet along the outer contour of the inner shape; and
  a deformation means for deforming one of the inner shape and of the peripheral shape by convex bending toward the side opposite the cutting line, and carrying out the extraction of the inner shape relative to the peripheral shape while maintaining the convex bending of said one of the inner shape and of the peripheral shape, with the deformation means and/or another means for maintaining the convex bending.

The invention will be better understood on reading the following description, given solely by way of nonlimiting example, with reference to the following figures:

FIGS. 3 to 5 are schematic vertical cross-sectional views of various steps of a process according to one particular embodiment of the invention;

Figure 1A:
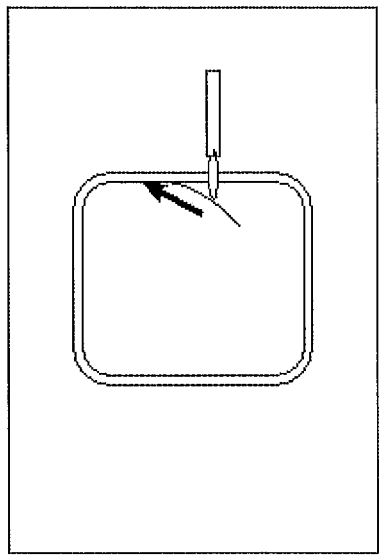
FIGS. 1a to 1d are schematic top views of a manufacturing process using waterjet cutting, according to the prior art.
Figure 1B:
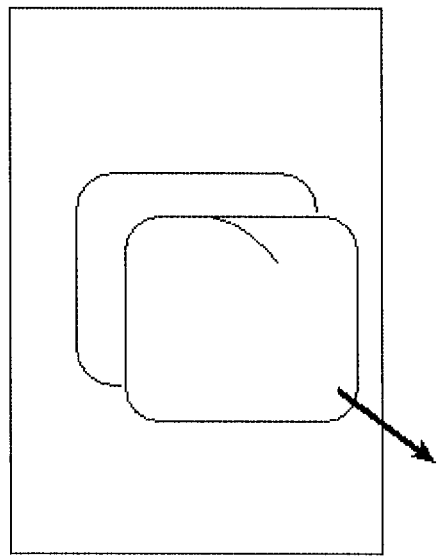
Figure 1C:
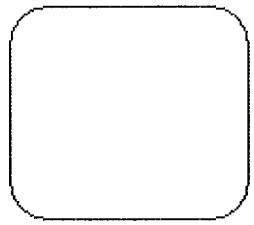
Figure 1D:
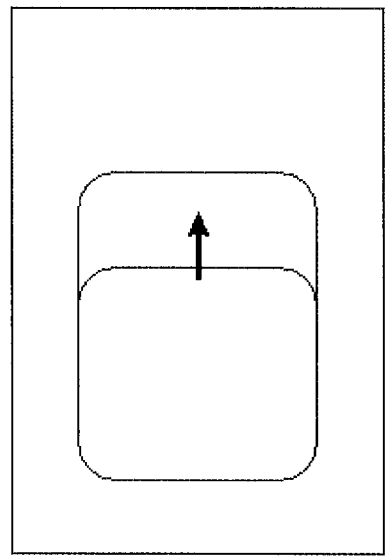
Figure 2A:
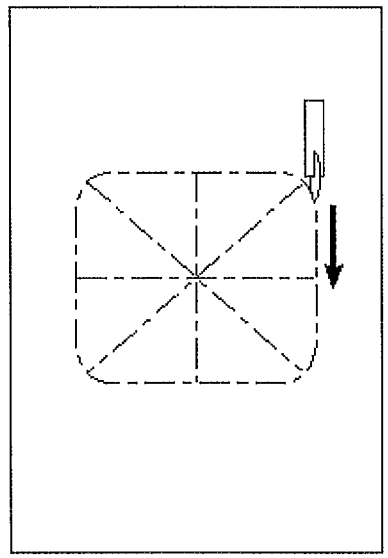
FIGS. 2a to 2d are views similar to FIGS. 1a to 1d illustrating another technique for extracting an inner shape according to the prior art, by cutting and break-out.
Figure 2B:
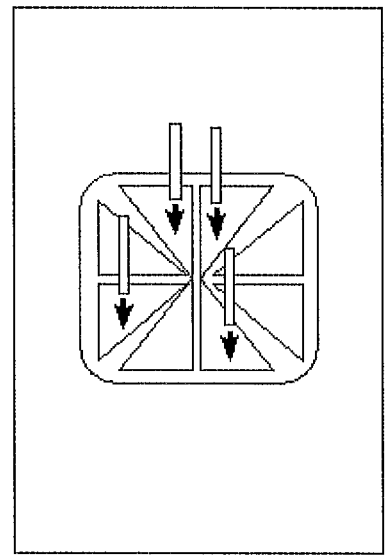
Figure 2C:
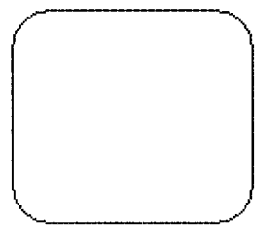
Figure 2D:
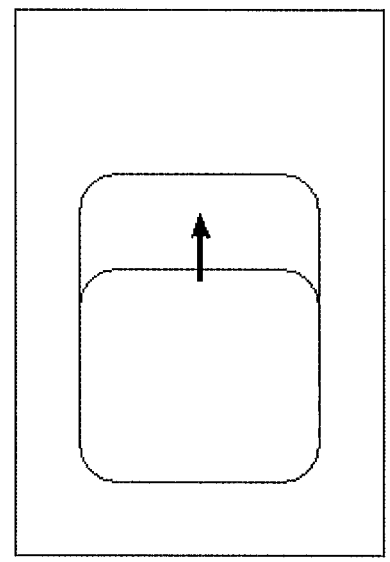

FIGS. 3 to 5 schematically illustrate a process according to one particular embodiment of the invention, consisting firstly of a step of scoring a cutting line 2 (FIG. 3), that is to say of creating a crack on a first face 4A of the glass sheet 4, followed by a step of breaking out by convex bending of the inner shape.

It should be noted that, throughout the text, the term "inner shape" is understood to mean a shape, the contour of which is a closed line and which is on the inside with respect to the peripheral contour of the glass sheet.

It should also be noted that the glass sheet to be cut is typically a "blank". In order to produce a blank, generally glass sheets of rectangular or trapezoidal shape, which are referred to as "blanks", are firstly cut from jumbo or lehr-end size glass sheets. These are glass sheets having a shape which is a convex polygon containing the final glazing to be produced while leaving around the entire perimeter a "trim" sufficient for carrying out the optional breaking-off of the edges. As a variant, it is a ready-to-shape glass sheet, i.e. the shape of which corresponds substantially to the final shape of the glazing. It is however, generally, a glass sheet of any suitable type, even if it is preferably a flat glass sheet.

It should also be noted that the jumbo and lehr-end size glass sheets are glass sheets obtained on the line for manufacturing a ribbon of float glass.

The scoring of the cutting line is, for example, carried out using a glass-cutting wheel 8 or any other suitable cutting instrument, such as for example a laser. The cutting line 2 is a crack intended to enable the breaking along this line during the break-out step. It is therefore a partial cut, i.e. only over a portion of the thickness of the glass sheet. This is what a "cutting line" is understood to mean throughout the text.

FIGS. 4 and 5 illustrate the principle of the invention, namely breaking the glass sheet along the cutting line 4 by convex bending of the inner shape 6 (or alternatively of the peripheral shape 10 as illustrated in FIGS. 9a-9d and explained later on). This convex bending is carried out toward the side opposite the side of the cutting line 4, i.e. downward in the figures.

The peripheral shape 10 is itself maintained in its initial state, the deformation thereof by bending being prevented (or only limited) by a suitable holding means, such as a suction means, associated with a bearing means that bears the peripheral shape, as explained in greater detail below.

The differential bending of the inner shape 6 relative to the outer shape 10, simultaneously over the whole of the contour of the inner shape, achieves the break-out and makes it possible to separate the edges of the inner shape from the inner contour of the peripheral shape, which facilitates the extraction of the inner shape.

The extraction of the inner shape 6 is for example carried out in a direction opposite to that of the bending, as illustrated by FIG. 5 in which the extraction is carried out upward. This is, as a variant, an extraction of any suitable type, insofar as the shape being bent is kept bent during the extraction.

FIGS. 6a to 6d, 7a to 7d and 8a to 8d illustrate more specifically three methods of implementing the invention, provided by way of example, and according to a first embodiment in which the inner shape 6 is bent. According to a second embodiment which will be explained with reference to FIGS. 9a-9d, it is the peripheral shape 10 which is bent.

In the example from FIGS. 6a to 6d, just like in all the other examples from FIGS. 7a-9d, a cutting line is scored along the contour of the inner shape, at a first cutting station. The glass sheet is placed, for this purpose, on a mat of felt type or of any other suitable type.

The glass sheet is then transferred by any suitable means to a break-out station, more particularly to a support table 12 that forms bearing means for the glass sheet.

In the three examples from FIGS. 6a-8d, the table is provided with leaktight bearing seals 14, 16 arranged one around the other. A first seal 14 is provided in order to be, after installation of the glass sheet, along and around the cutting line, on the outside with respect to the cutting line. The outer seal 16 is for its part provided along and on the inside with respect to the outer contour of the peripheral shape 10.

As a variant however, in particular as illustrated by the example from FIGS. 9a-9d, the inner seal 14 is provided opposite the cutting line 2 and thick enough to be in leaktight contact with the inner shape 6 and with the peripheral shape 10. This is a variant that is also applicable to the examples from FIGS. 6a-8c.

Figure 6A:
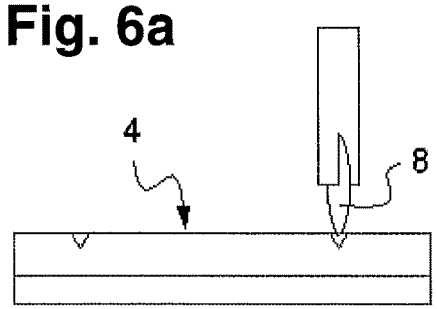
FIGS. 6a to 6d, 7a to 7d and 8a to 8d are also schematic vertical cross-sectional views of the steps carried out during three different break-out processes of a first embodiment
Figure 6B:
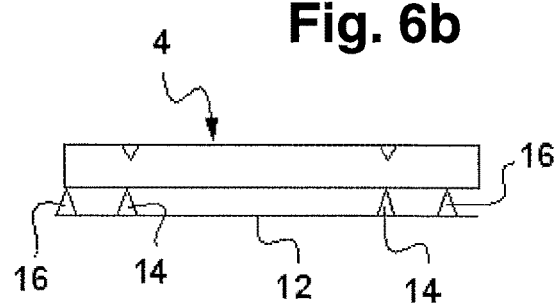
Figure 6C:
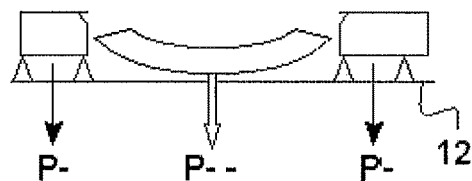

The inner seal 14 makes it possible to create a zone of low pressure ($P^{--}$) between the peripheral shape 10 and the support table 12, thus acting as convex bending means (see FIG. 6c). A suction device is for example incorporated into the support table for this purpose (not represented).

Owing to the additional presence of the outer seal 16, a partial vacuum ($P^-$) may be created in the zone opposite the peripheral shape 10, so as to keep the peripheral shape flat, i.e. form a holding means that counters the bending deformation by the deformation means applied to the inner shape 6. A suction device (not represented) is also incorporated into the support table 12 for this purpose.

The outer seal is however optional should the peripheral shape 10 be held mechanically, for example by applying a flat counter-form to the peripheral shape (variant not represented).

It should also be noted that, as a variant that is not represented, no means for keeping flat, in opposition to the convex bending deformation, is provided, in particular should the peripheral shape be of large size and the effect of gravity on the peripheral shape (or the effect of gravity on the inner shape in the second embodiment) be sufficient to obtain the desired differential deformation between the inner shape 6 and the peripheral shape 10.

Figure 6D:
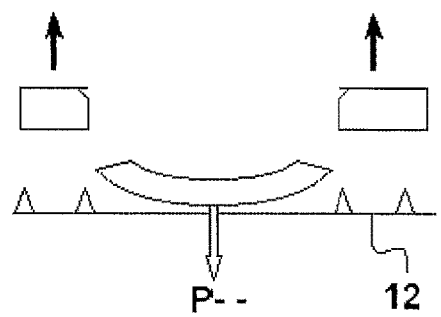
Figure 7A:
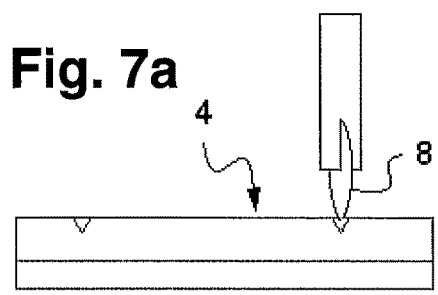
Figure 7B:
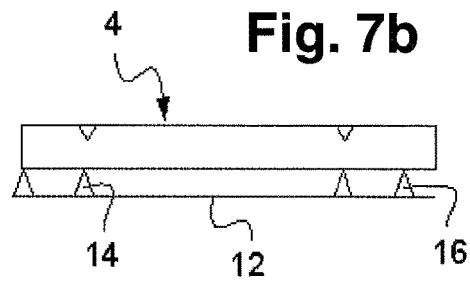
Figure 7C:
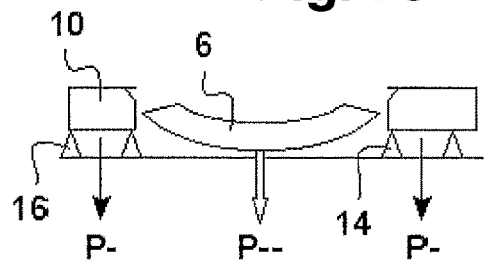
Figure 7D:
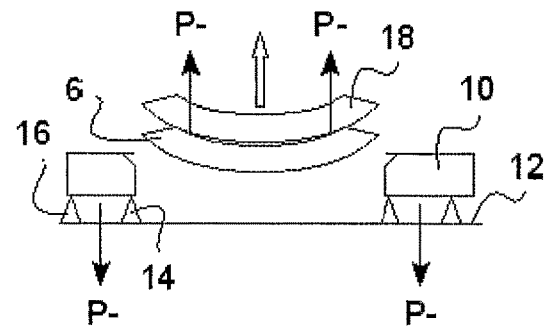
Figure 8A:
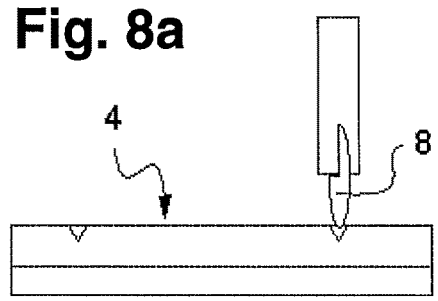
Figure 8B:
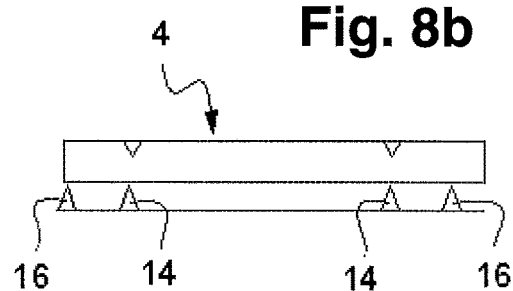
Figure 8C:
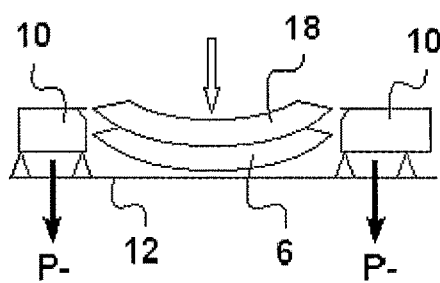
Figure 8D:
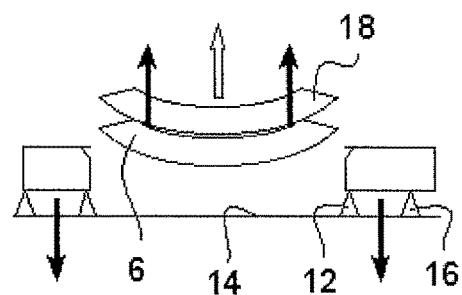
Figure 9A:
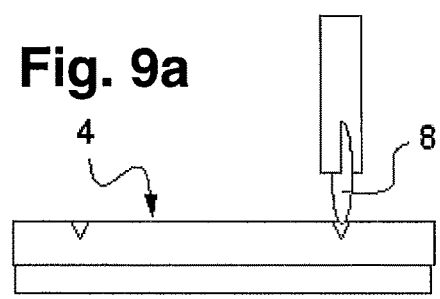
FIGS. 9a to 9d are similar figures of an example of a second embodiment.
Figure 9B:
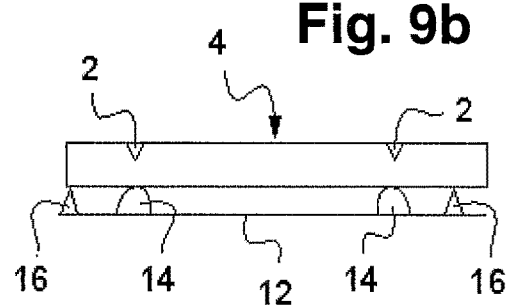
Figure 9C:
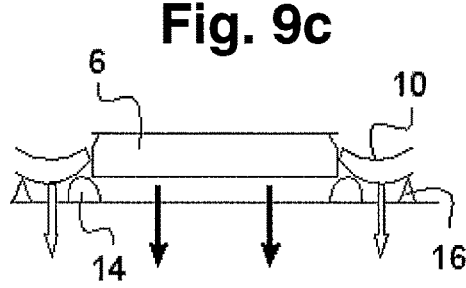
Figure 9D:
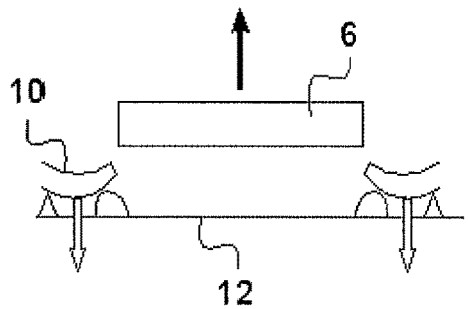

In FIG. 6d, the inner shape 6 is kept bent without moving while the peripheral shape 10 is removed, for example by a suction table or another means of any suitable type such as a mechanical means.

In the second example from FIGS. 7a to 7d, the break-out is achieved in the same way as in the first example from FIGS. 6a-6d, but the extraction is carried out by removal of the inner shape 6 using a suitable suction table in order to keep the inner shape 6 bent during the extraction. It is thus understood that the convex bending deformation means is not necessarily the same as the means for maintaining the convex bending during the extraction. In this specific case, the convex bending deformation means for the break-out is formed by the bearing seals 14, 16 and an associated suction device whilst the means for maintaining the convex bending is formed by a suction table provided on the opposite side of the glass sheet, and preferably having a convex counter-form 18 corresponding to the convexly bent inner shape.

The peripheral shape is still kept flat by suction.

In the third example from FIGS. 8*a* to 8*d*, the bending is carried out not by suction but by mechanical bearing of a specific counter-form 18. The counter-form 18 has a shape corresponding to the convex shape desired for the break-out, i.e. a suitable convex shape.

The extraction then takes place by suction of the inner shape onto the convex counter-form 18 that was used for the break-out, thus forming a means for maintaining the bending.

In the second embodiment illustrated by FIGS. 9*a* to 9*d*, the inner shape is kept flat whilst the peripheral shape is deformed by convex bending toward the side opposite the cutting line 2.

In this example, the deformation means for the break-out is a suction means, the support table 12 forming, between the two seals 14, 16, a low-pressure zone sufficient to deform the peripheral shape 10. The inner shape 6 is itself subjected to a sufficient low-pressure zone for the holding thereof in opposition to the bending deformation.

The extraction of the inner shape is carried out, for example, by a suction table, whilst the convex bending of the peripheral shape 10 is maintained by suction.

It should be noted that, as a variant, in both embodiments, the bending could be carried out upward, for example if the glass sheet was held in the air by suction. The cutting line 2 would in this case be on the underside of the glass sheet.

The machine illustrated schematically in FIGS. 6*a* to 9*d* has at least one computer and one memory on which programs for controlling the machine are stored. The programs are suitable for controlling the machines from FIGS. 6*a* to 9*d*, more particularly for controlling the cutting tool 6, and the bending deformation means, holding flat means and extraction means.

The invention claimed is:

1. A machine for breaking out an inner shape in a glass sheet intended to form a glazing, comprising:
    a cutting tool and a displacement system configured to provide a relative displacement between said cutting tool and the glass sheet to produce a cutting line on a first side of the glass sheet that delimits an outer contour of said inner shape and an inner contour of a peripheral shape;
    a bearing system configured to bear against a second side of the glass sheet along the outer contour of the inner shape, said second side being opposite the first side;
    a deformation system configured to deform one of the inner shape and of the peripheral shape by convex bending of said one of the inner shape and of the peripheral shape toward the second side that is opposite the cutting line, said convex bending creating a differential deformation between the inner shape and the peripheral shape that is sufficient to break out the inner shape along the cutting line and separate the inner shape from the peripheral shape so that a distance needed for a contactless extraction of the inner shape relative to the peripheral shape is created, and
    an extraction system configured to extract the inner shape or the peripheral shape while the convex bending of said one of the inner shape and of the peripheral shape is maintained.

2. The machine of claim 1, wherein the bearing system comprises a support table to receive said glass sheet, and an inner bearing seal arranged on the support table to contact said second side of the glass sheet and extend along and around the cutting line.

3. The machine of claim 2, wherein the deformation system comprises a first suction device arranged to create a zone of low pressure defined in a volume formed by said support table, said inner bearing seal and said inner shape.

4. The machine of claim 3, wherein the bearing system comprises an outer bearing seal arranged on the support table and configured to contact said second side of the glass sheet, said outer bearing seal extending along, and on the inside with respect to an outer contour of, the peripheral shape.

5. The machine of claim 4, wherein the deformation system comprises a second suction device arranged to create a partial vacuum at a vacuum pressure that is less than a vacuum pressure of the zone of low pressure.

6. The machine of claim 3, wherein the extraction system is configured to move the peripheral shape while the first suction device creates the zone of low pressure to maintain the convex bending of the inner shape.

7. The machine of claim 1, wherein said extraction system is configured to extract said inner shape or outer shape by moving said inner shape or outer shape relative to the other of the inner shape or outer shape, while the convex bending of said one of the inner shape and of the peripheral shape is maintained.

8. The machine of claim 7, wherein the extraction system is a suction table.

9. The machine of claim 8, wherein the suction table has a convex counter-form corresponding to a convexly bent shape of said one of the inner shape and of the peripheral shape produced by the deformation system.

10. The machine of claim 7, wherein said extraction system is configured to move the peripheral shape while the deformation system maintains the convex bending of the inner shape so as to extract the peripheral shape.

11. The machine of claim 7, wherein said extraction system is configured to move the inner shape while the convex bending of said inner shape is maintained so as to extract the inner shape.

12. The machine of claim 7, wherein said extraction system is configured to move the inner shape while the convex bending of said outer shape is maintained so as to extract the inner shape.

13. The machine of claim 1, wherein the deformation system is a mechanical counter-form that has a convex shape and that is applied against said one of the inner shape and of the peripheral shape to produce the convex bending.

14. The machine of claim 1, wherein the convex bending is carried out by the deformation system is an upward convex bending.

* * * * *